United States Patent [19]

Rehm

[11] Patent Number: 4,679,687
[45] Date of Patent: Jul. 14, 1987

[54] APPARATUS TO EFFECT STRESS-FREE TRANSPORTATION OF A RIBBON ON A CONVEYOR CAPABLE OF NEGOTIATING TURNS

[75] Inventor: Roger P. Rehm, Orrville, Ohio

[73] Assignee: Singer Products Corporation, Smithville, Ohio

[21] Appl. No.: 782,874

[22] Filed: Oct. 2, 1985

[51] Int. Cl.$^4$ .............................................. B65G 21/18
[52] U.S. Cl. .................... 198/778; 198/690.2; 198/698; 198/852
[58] Field of Search ...................... 198/690.2, 698, 699, 198/778, 822, 836, 848–853, 952; 226/170, 171; 425/383, 391, 396, 403

[56] References Cited

U.S. PATENT DOCUMENTS

| Re. 27,690 | 7/1973 | Roinestad et al. | 198/852 |
| 3,348,659 | 10/1967 | Roinestad | 198/778 |
| 3,777,877 | 12/1973 | Piper | 198/852 X |

FOREIGN PATENT DOCUMENTS 0120245  10/1984  European Pat. Off. ............ 198/848

Primary Examiner—Robert J. Spar
Assistant Examiner—Lyle Kimms
Attorney, Agent, or Firm—Renner, Kenner, Greive, Bobak & Taylor

[57] ABSTRACT

The present invention is directed to members (10) by which a flat conveyor belt (11) can negotiate a turn while supporting a ribbon (12) of material and without deleteriously deforming that ribbon. A series of flights (50) are spaced longitudinally along the conveyor (11). Each flight is inclined at an angle ($\theta$) with respect to the plane of the conveyor (11). The apex (52) of the angle $\theta$ is located in proximity to the outer edge of the conveyor such that the support member 51 is inclined upwardly and inwardly. Because of the orientation of the inclination, the outer edge of the ribbon will be supported by the support member (51) and/or the belt member (20) to be transported without any change in disposition and without being subjected to any substantial tensile stresses. Progressing laterally inwardly from the outer edge of the ribbon, the ribbon is allowed to drape, or sag, between the successive flights in the form of a catenary, thus allowing the inner edge of the ribbon to assume a controlled disposition that will not be deleterious. Selection of the inclination angle $\theta$ is a function of the spacing between successive support members, the radius of the turn and the width of the conveyor. These factors can be stated as a mathematical equation by which to determine the optimum value for the inclination angle $\theta$.

8 Claims, 8 Drawing Figures

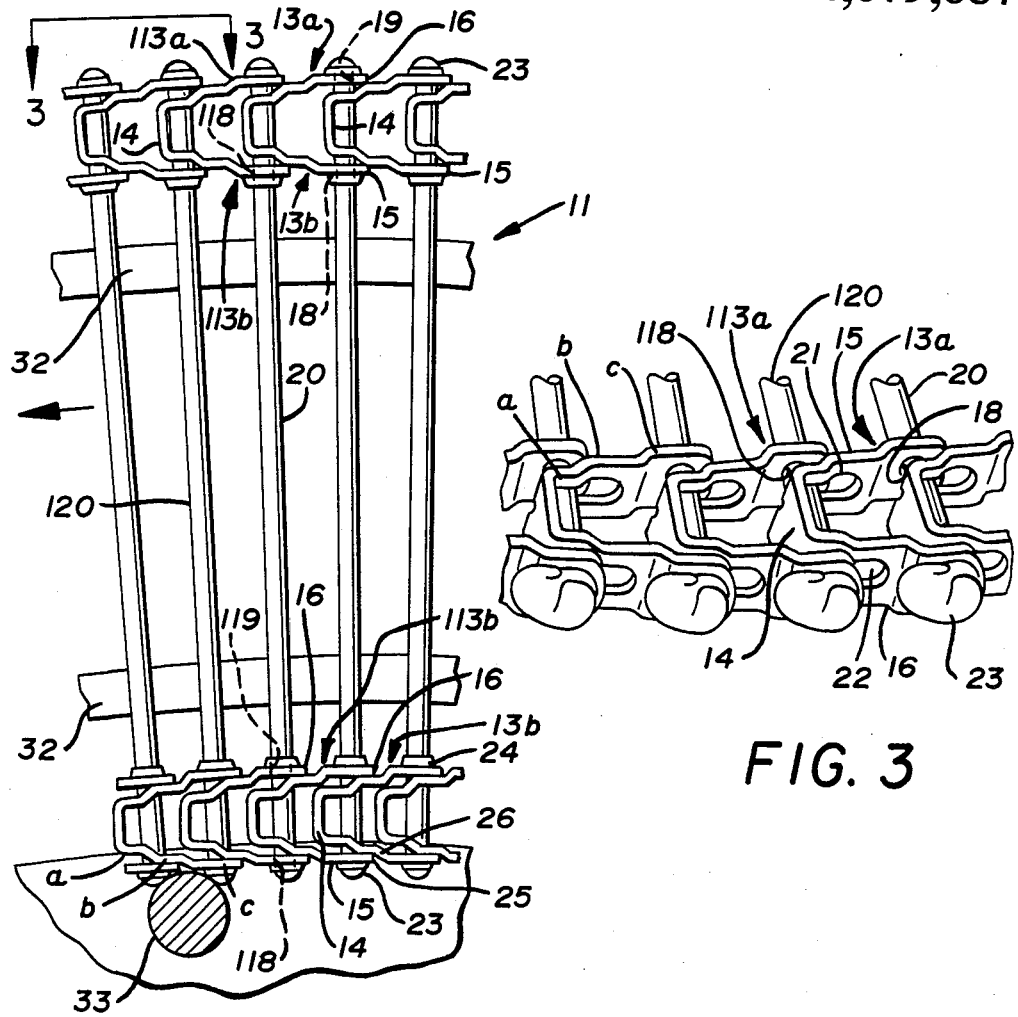
FIG. 2
FIG. 3
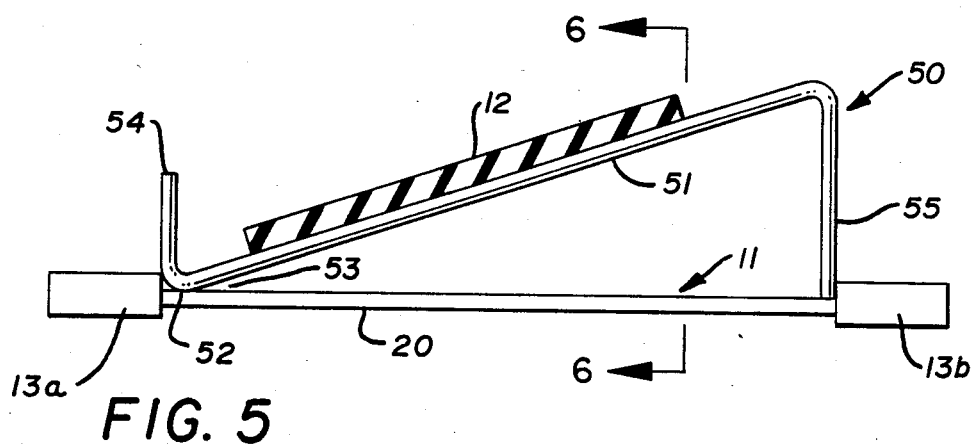
FIG. 5

APPARATUS TO EFFECT STRESS-FREE TRANSPORTATION OF A RIBBON ON A CONVEYOR CAPABLE OF NEGOTIATING TURNS

TECHNICAL FIELD

The present invention relates generally to substantially flat conveyor belts capable of negotiating right- or left-hand turns while remaining laterally flat. More particularly, the present invention relates to an improvement for such a conveyor that allows it to accommodate a strip, or ribbon, of material having substantial width but without deleterious deformation of the material so supported, even while said conveyor is negotiating a turn.

BACKGROUND ART

Perhaps the most successful construction for a conveyor belt capable of negotiating a right- or left-hand turn while remaining laterally flat comprises an assembly of pickets, or links, and rods, or belt members, that are uniquely conjoined. The pickets are nested and joined by inserting a straight rod, or belt member, through the trailing hole of the leading pickets, and the front end slots of the trailing pickets. Each end of the rod is provided with a head to retain the pickets on the respective connector rods. A longitudinal series of such pickets, each sequentially nested and operatively conjoined to the next successive picket by a connector rod comprises the desired conveyor belt of the type for which the subject invention is primarily intended. Further details of the aforesaid conveyor belt are disclosed in U.S. Pat. No. 3,348,659 and Re. Pat. No. 27,690 and are sold under the registered trademarks OMNI-GRID and OMNIFLEX.

Because of the capability of the aforesaid conveyor belts to negotiate turns, while remaining laterally flat, as well as to move in a straight line—i.e., a straightaway—they obviate the necessity for effecting transfers at the transition between a straightaway run and a turn. In addition, such a conveyor belt construction permits the conveyor to be employed in such a way as to effect the most efficient use of space. That is, the conveyor belt may be oriented in either an ascending or a descending spiral, or helix. The number of spiral tiers through which such a conveyor may pass is, as hereinafter more fully explained, limited only by the vertical "lead" of the helix when considered in conjunction with the height of the ceiling where the arrangement is located. For all practical purposes the minimum spiral lead available is equal to the height of whatever is to be supported on the conveyor plus the thickness of the conveyor belt, its supporting structure and the clearance desired between the successive passes of the conveyor.

To minimize tensile loading on the conveyor belt the spiral disposition of the conveyor belt continuously engages a cylindrical cage which is itself rotated to effect a simultaneous application of the driving force to the entire length of the conveyor which engages the cage. A plurality of such cages may be employed with the conveyor belt disposed in ascending and descending combinations to provide the length of conveyor necessary to accomplish the process effected thereon.

As is well known, the radius around which the aforedescribed flat belt conveyor can be flexed is determined by the geometry of the nested pickets, the degree to which they can telescope and the dimensions of the slots through which the connector rods are received in each picket. Manufacturers of the aforesaid conveyor belts have determined the optimum configuration for the pickets as well as the dimensions for the slots, and with those aspects of the pickets standardized the minimum turning radius of the belt is a function of the width of the conveyor belt itself. Current slot dimensions, and picket configurations, are such as to establish a nominal inside turning radius of 2.2 times the width of the conveyor belt. On that basis such a conveyor belt, when disposed in a spiral configuration about a cage, demands that the minimum outside diameter of the spiral be equal to 6.4 times the width of the belt.

As can be readily understood, the aforesaid relationship permits a most efficient use of precious floor space. That fact, taken in conjunction with the multitudinous tiers permitted by such an arrangement affords an idealized use of space.

A plurality of discrete objects can be conveyed along a straightaway or through turns on the aforedescribed conveyor belt in a virtually endless flow without jostling or undesirable localized accumulations. However, as desirable as a spiral arrangement may be for conveying discrete objects, it is seriously deficient when attempting to convey a continuous strip, or ribbon, of material having any appreciable width. For example, in the rubber industry continuous ribbons of material having appreciable width must be cooled and/or cured. The cooling and/or curing process may require that the ribbon of material move through an extended distance, which distance is a function of the rate at which the ribbon is being supplied and the length of time required to effect the desired result. To continue moving the ribbon in a straight line at the rate it is being fed, and for the time required, often requires an inordinate amount of space. To be able to accomplish the desired process during passage of the ribbon through one or more spiral arrangements of a conveyor belt would, therefore, be highly desirable except for the fact that a flat ribbon cannot negotiate a spiral path without deleterious results. That is, one side of the ribbon may be unduly subjected to compressive stresses and the other side may be unduly subjected to tensile stresses. In addition, it may even be virtually impossible to retain the ribbon on the conveyor belt itself.

DISCLOSURE OF THE INVENTION

It is, therefore, a primary object of the present invention to provide a means by which to permit a flat ribbon of material to be supported on a conveyor belt capable of negotiating turns without deleteriously deforming the ribbon.

It is a further object of the present invention to provide a means, as above, which will permit the conveyor belt to traverse the desired spiral path, either ascending or descending, without deleteriously deforming the ribbon carried thereon.

It is a still further object of the present invention to provide a mathematical equation for determining the required disposition of the aforesaid means for use in conjunction with any selected spiral path.

These and other objects of the invention as well as the advantages thereof over existing and prior art forms, which will be apparent in view of the following specification, are accomplished by means hereinafter described and claimed.

In general, the present invention is readily adapted to a conveyor system having a plurality of transverse belt members, or connector rods, with opposed ends. Inasmuch as the present invention facilitates the transportation of a ribbon of material as the conveyor system moves through a turn, the opposed ends of the belt members will be designated as being the inner and outer ends rather than being designated as the right- and/or left-hand ends.

Picket means are secured to each end of the rod-like belt members, and the pickets are of such configuration as to be nestable as well as telescopic, one with respect to another. Each picket interacts not only with the belt member to which it is secured but also with the belt member secured to the picket disposed successively in the lead of the referenced picket.

Support means are presented at selected longitudinal intervals along the conveyor belt. In conformity with the frame of reference that there are inner and outer edges on the conveyor belt as it negotiates a turn, the support means are disposed at substantially the level of the belt member in proximity to the outer edge of the conveyor belt. The support means is inclined upwardly and inwardly toward the inner edge of the conveyor belt at an angle $\theta$, and the particular angle is determined as a function of the longitudinal spacing between successive support members, the radius of the turn and width of the conveyor belt.

One representative embodiment as well as one alternative form of a conveyor system embodying the concept of the present invention are shown by way of examples in the accompanying drawings without attempting to show all the various forms and modifications in which the invention might be embodied; the invention being measured by the appended claims and not by the details of the specification.

BRIEF DESCRIPTION OF THE DRAWINGS

FIG. 1 is a schematic perspective of a conveyor system incorporating the present invention in conjunction with a continuous conveyor belt capable of negotiating a turn, said belt being disposed through an ascending spiral, or helix, and then along a brief straightaway, through a descending spiral and back to the start; the entire system being housed to control temperature, humidity or the like;

FIG. 2 is an enlarged top plan view of a portion of the belt, and associated mechanism, as it traverses one of the spirals depicted in FIG. 1;

FIG. 3 is a perspective taken substantially along line 3—3 of FIG. 2 and depicting the interrelationship between successive pickets and the rod-like belt members, said drawing being turned 180° in order that the direction of movement may be represented as being from right to left in the adjacent FIGS. 2 and 3;

FIG. 5 is a cross-sectional view taken substantially along 5—5 of FIG. 4 and appearing on the same sheet of drawings as FIGS. 2 and 3;

DESCRIPTION OF TWO EXEMPLARY EMBODIMENTS

Figure 1:
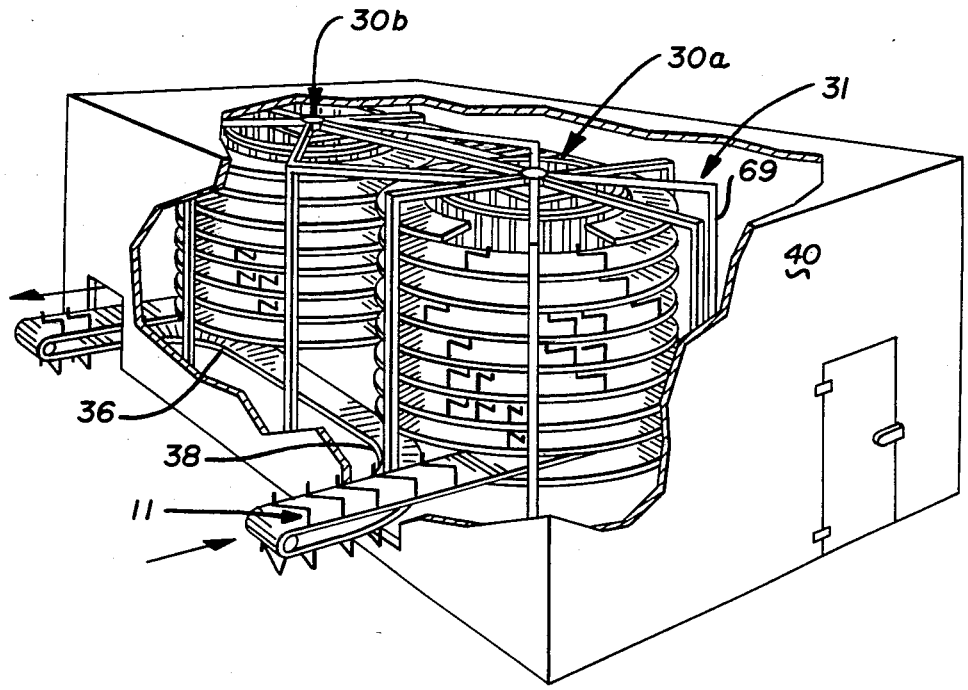

The present invention is directed to a means, indicated generally by the numeral 10 on the attached drawings, by which to permit a conveyor belt 11 to traverse a selected right- or left-hand turn while supporting a flexible ribbon of material 12 and yet preclude deleterious distortion of the ribbon.

Although details for the construction and operation of at least one conveyor system with which the present invention has been found to be eminently compatible are fully disclosed in U.S. Pat. No. 3,348,659, it is deemed convenient for purposes of facilitating the disclosure of the present invention at least briefly to describe a portion of the prior conveyor belt 11. As best seen in FIGS. 2 and 3, the conveyor belt 11 comprises a plurality of pickets 13 fashioned from flat wire. Each picket 13 is of generally U-shaped configuration. That is, each picket 13 has a base 14 with a pair of laterally-spaced legs 15 and 16 extending outwardly from each end of said base. The legs 15 and 16 are tapered outwardly from base 14, as in a series of steps "a", "b" and "c" to permit not only initial nesting of successive pickets but also to permit the successive pickets to telescope, as will hereinafter become more fully apparent.

A bore 18 is provided in the end of each leg 15 that is distal with respect to the base 14, and a register bore 19 is similarly provided through the distal end of leg 16.

Pickets 13a form one side of the conveyor 11 and laterally spaced pickets 13b form the other side of the conveyor 11. A rod, or belt member, 20 is rotatably received within the registered bores 18 and 19 of a picket 13a located on one side of the conveyor 11, and said rod 20 extends across the transverse dimension of the conveyor belt 11 to be rotatably received within the bores 18 and 19 of a corresponding picket 13b on the opposite side of the conveyor 11.

A slot 21 is provided in leg 15; the major dimension of the slot 21 is oriented parallel to the plane of the picket 13, and the slot 21 extends from a point proximal to base 14 (in step "a") outwardly along the leg 15 to a point within step "b". A similar slot 22 is provided within leg 16, and the slots 21 and 22 are registered. The minor dimension of the slots 21 and 22 are selected to permit the rod 20 to be slidably received within the slots, and the major dimension is selected to determine the degree to which the successive pickets can telescope.

With reference to FIG. 2 it can be seen that the length of the rod-like belt member 20, which is received within the bores 18 and 19 of pickets 13a and 13b determines the width of the conveyor 11. A head 23 is provided on each end of the belt member 20 to preclude the pickets 13a and 13b from inadvertantly disengaging axially outwardly off the ends of the belt member 20, and a spur 24, or the like, extends radially outwardly from each belt member 20 to embrace each picket in opposition to the head 23 and thereby prevent the pickets from sliding axially inwardly along the belt member 20 on which they are mounted.

The lead end (the end defined by the base 14) of the aforesaid pickets 13a and 13b are each nested within the trailing end (the open end of the U-shaped configuration) of the next successive pickets 113a and 113b, respectively, and the belt member 120 received within the bores 118 and 119 of pickets 113a and 113b are slidably received within the slots 21 and 22 of the pickets 13a and 13b. This arrangement continues in an endless loop to define the conveyor 11.

Figure 4:
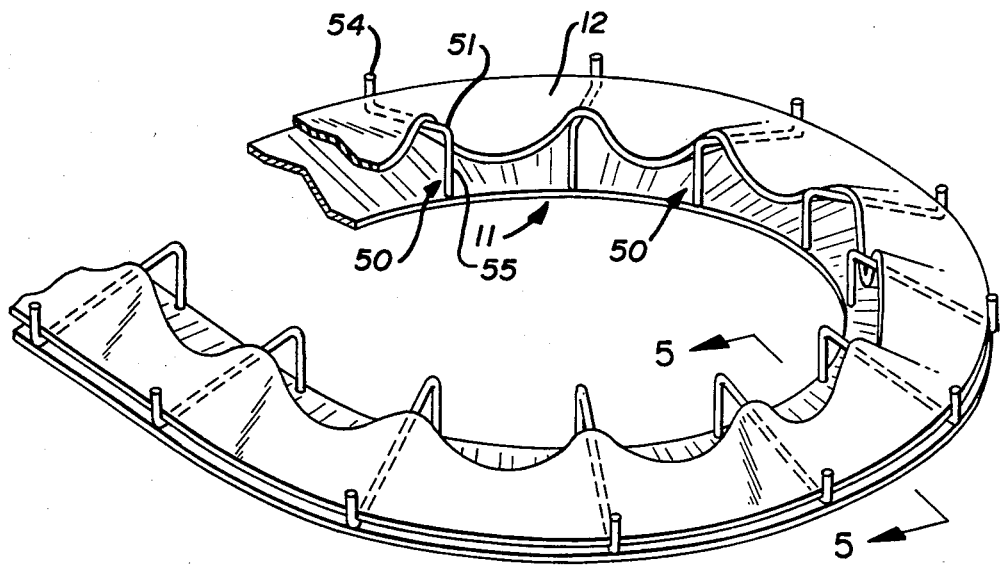
FIG. 4 is a schematic perspective of a ribbon as it is supported by a conveyor embodying the concept of the present invention, said conveyor being depicted as it enters upon and traverses approximately 270° of an ascending spiral, said figure appearing on the same sheet of drawings as FIG. 1.

When the successive pickets are nested under tension, as when the conveyor is moving in a straightaway path, the base 14 of each picket 13 is disposed in contiguous juxtaposition to the belt member 120 extending between the next successive pickets 113. This dispostion is substantially maintained by those pickets on the outside of the turn, as depicted in FIGS. 2, 3 and 4. However, when the conveyor turns, either to the right or to the left, the pickets on the inside of the turn telescope together with the stepped taper "b" of picket 13 sliding along step "c" of picket 113.

The telescoping of the radially inwardly disposed pickets is maintained throughout the turn, irrespective of the angular extent thereof. The major dimension of the slots 21 and 22 (FIG. 3) as well as the physical engagement of the outermost end 25 of leg 15 step "c" on the leading picket 113 with the transitional flare 26 between steps "b" and "c" on the trailing picket 13 delimit the extent to which the trailing picket 13 can telescope within the leading picket 113 on a turn. Commercially available pickets from manufacturers licensed under U.S. Pat. No. 3,348,659 have tended to standardize the dimensions of the slots as well as the step tapers of the pickets such that the minimum inside turning radius is 2.2 times the width of the conveyor belt 11.

Such a conveyor belt can be disposed in a successive plurality of 360° ascending, or descending, turns to define a spiral, or helical, path. On the basis of the standardized dimensions of the slots and stepped tapers, the minimum outside diameter of such a spiral is equal to approximately 6.4 times the width of the conveyor belt 11. Conveyor belts 11 are commercially available in widths from about six inches (6") to about forty-eight inches (48"), and by employing the low tension feature for rotating a spiraled configuration, as is also taught in U.S. Pat. No. 3,348,659, the uninterrupted belt length that can be so employed is virtually limitless.

A spiraled conveyor is generally mounted on a cage 30 (FIG. 1) that is rotatably secured in a framework 31. A low-friction slideaway 32 (FIG. 2) is supported from the stationary framework, and vertically oriented driving bars 33 on the cage 30 engage the heads 23 on the radially inner ends of the belt members 20, 120 . . . The cage 30 is rotatably mounted and may, therefore, be connected to a power source, not shown, to effect rotation at the desired speed. By thus rotating the case 30 to move the conveyor belt 11 along its spiral course, the forces applied to move the conveyor are distributed along its length, thus accomplishing the low tension drive that permits virtually limitless lengths for conveyors so arranged.

As depicted in FIG. 1 the conveyor may enter at the bottom of cage 30a, ascend the spiral form thereon, move tangentially off the top of cage 30a through a connecting straightaway 35, enter the top of cage 30b, ascend the spiral form thereon and move tangentially off the bottom thereof. The conveyor may then be returned and directed through two 90° turns 36 and 38 to repeat the aforesaid pathway.

In the exemplary embodiment depicted the conveyor makes slightly more than eight circumferential passes, both on the ascending and descending cages. It should, therefore, be apparent that the aforesaid arrangement very efficiently employs not only the horizontal floor space but also the vertical space between the floor and the ceiling.

In addition to the aforesaid efficient use of space one may economically enclose the system in a shell container, or housing, 40 whereby to permit facile control of the temperature, humidity, etc. of the environment through which the conveyor 11 moves.

The aforesaid structural arrangements have heretofore been employed with great success in heating, cooling and even freezing discrete objects carried on the conveyor 11. Such arrangements have not, however, been successful in accommodating products that are in the form of a continuous ribbon. A continuous ribbon—i.e., continuous strips of material having some appreciable width, particularly as compared to its thickness—are unable to adapt to a spiral path without subjecting the inside edge of the ribbon to compressive stresses which result in undesirable deformation and wrinkling. The deformation can effect unacceptable variations to the thickness of the rubber or even cause large buckles which can jam the conveyor. It has, therefore, heretofore been deemed that the use of spiral conveyors was unacceptable for transporting ribbons of material 12.

However, as will now be disclosed it is possible for ribbon to traverse a turn, even an extended turn as exists when a conveyor moves along a multi-tiered, spiral path by permitting the outside of the ribbon to maintain its dimensions unencumbered and permitting that portion of the ribbon radially inwardly of the outside edge to drape progressively toward the inside edge, as is necessary to preclude subjecting the ribbon to deleterious compressive stresses. When so disposed the ribbon tracks beautifully along the conveyor and may follow either an ascending or descending path in a spiral configuration without being subjected to any stresses that could reasonably be determined to damage the ribbon.

Figure 6:
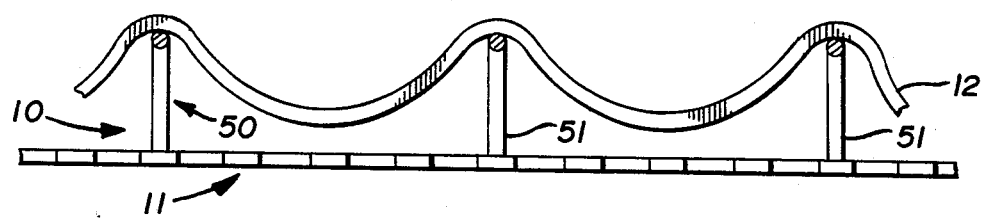
FIG. 6 is a vertical section taken substantially along line 6—6 of FIG. 5 depicting the catenary disposition of the ribbon in end elevation as it is supported on successive flights along the inside of a turn.

The aforesaid result may be achieved by providing the conveyor 11 with a longitudinally spaced series of transversely oriented flights 50 (FIGS. 4, 5 and 6). The flights each present a support member 51 that is inclined at an angle $\theta$ with respect to the plane of the conveyor 11, the plane of the conveyor being defined by the plane within which the belt members 20 lie. It is imperative that the apex 52 of the angle $\theta$ be disposed to the outside of the conveyor 11 as it progresses along the periphery of the turn.

When determining the disposition of a flight to accommodate a stated turn, that turn can be any degree of angular displacement desired, including multiples, or portions, of a 360° angular displacement. As such, the following discussion is as appropriate to a modest turn as it is to multi-tiered, spiral conveyors.

In any turn the outside of the conveyor 11 is assumed to maintain the same length as it would along a straightaway. Thus, to accommodate the turn the inside of the conveyor will accommodate to a path of lesser dimension. That is, the outer edge of the conveyor travels along an arcuate path without changing its dimension, and this results because the pickets, while partially nested, are telescoped apart as far as their physical dimensions permit. Along the inside edge of the conveyor, to the contrary, the pickets telescope together to accommodate a path of lesser arcuate dimension, even though the two arcuate pathways are subtended by the same angle. Inasmuch as the lengths of the two arcuate pathways are a function of their radii multiplied by a constant which comprises the number of radians constituting the subtended angle (assuming that the turn under consideration is effected about a constant radius) establishes a collapse factor as being defined by the ratio of the two radii. If the radius about which the outside edge of the conveyor moves is equal to $R_1$, and the radius about which the inside edge of the conveyor moves is equal to $R_2$, then a collapse factor ($C_f$) can be mathematically expressed:

$$C_f = R_1/R_2$$

The collapse factor establishes the actual dimension between two reference points on the inside of the conveyor after they have moved toward each other as they traverse from a straightaway to the curved path. Thus, if the reference distance between the two points as they move along a straightaway is equal to $C_1$, and the distance between the two points in the turn is equal to $C_2$, one may quantify $C_2$ by the mathematical statement:

$$C_2 = C_1/C_f$$

It has been found that a typical ribbon 12 may be moved along the helical path delineated by cages 30a and 30b if the support surface 51 of the flights 50 are inclined at an angle $\theta$ which permits the ribbon to hang as a catenary between successively adjacent flights. The outside edge of the ribbon will likely present little, or no, deflection, but as one views the ribbon from the inner edge toward the outer edge (FIGS. 4 and 6) the ribbon will hang as a catenary between successive flights. The inner edge of ribbon 12 will hang as a catenary having not only the greatest span but also the greatest depth.

The length (L) of the catenary curve itself is a function of the span (S) between supports and the depth (D) to which the catenary extends beneath the level of the supports. Expressed mathematically:

$$L = S[1 + \tfrac{2}{3}(2D/S)^2]$$

In terms of the flights 50, and their relationship to the conveyor 11, the length (L) of the catenary is equal to the dimension between the successive flights as they move in a straightaway direction—i.e., the length (L) thereof is equal to $C_1$. The span (S) between successive flights on the inside edge of the conveyor is equal to $C_2$. Substituting:

$$C_1 = C_2[1 + \tfrac{2}{3}(2D/C_2)^2]$$

Solve for D:

$$C_1 = C_2 + \tfrac{2}{3} C_2 \left(\frac{2D}{C_2}\right)^2 \tag{1}$$

$$\frac{C_1 - C_2}{\tfrac{2}{3} C_2} = \left(\frac{2D}{C_2}\right)^2$$

$$\sqrt{\frac{C_1 - C_2}{\tfrac{2}{3} C_2}} = \frac{2D}{C_2}$$

$$D = \frac{C_2 \sqrt{\dfrac{C_1 - C_2}{\tfrac{2}{3} C_2}}}{2}$$

The above formula will provide the depth to which a catenary will hang when one knows the spacing between the flights at both the outer and inner edge of the conveyor as it moves along a curve.

In order to solve for the angular inclination ($\theta$) of the flight one need additionally know only that the width (W) of the ribbon 12. In that event:

$$\tan \theta = D/W$$

or $$\theta = \tan^{-1}(D/W) \tag{2}$$

One could, therefore, solve for the depth by virtue of equation (1) and substitute that value in equation (2). Sometimes, however, it is not convenient to determine the dimension between the inside reference points after the inner edge of the conveyor has telescoped together. Rather, it is generally more convenient to solve for $\theta$ in terms of the inner radius ($R_1$) of the turns through which the conveyor has moved, the width of the conveyor and the normal straightaway spacing ($C_1$) between the flights 50. To develop substitute terms for $C_2$ it should be appreciated that:

$$R_2 = R_1 + W$$

and $$C_f = R_2/R_1$$

Therefore:

$$C_f = \frac{R_1 + W}{R_1} \tag{3}$$

Inasmuch as:

$$C_2 = C_1/C_f \tag{4}$$

one can substitute the relationship recited by equation (3) into equation (4) to obtain:

$$C_2 = \frac{C_1 R_1}{R_1 + W} \tag{5}$$

Now, substituting the value for $C_2$ from equation (5) into equation (1):

$$D = \frac{\dfrac{C_1 R_1}{R_1 + W} \sqrt{\dfrac{C_1 - \dfrac{C_1 R_1}{R_1 + W}}{\tfrac{2}{3}\left(\dfrac{C_1 R_1}{R_1 + W}\right)}}}{2}$$

Hence:

$$\theta = \tan^{-1} \frac{\frac{C_1 R_1}{R_1 + W} \sqrt{\frac{C_1 - \frac{C_1 R_1}{R_1 + W}}{\frac{2}{3}\left(\frac{C_1 R_1}{R_1 + W}\right)}}}{2W} \quad (6)$$

To solve for typical insulation, wherein $C_1$ would be equal to twelve inches (12") and $C_2$ equals 8.65 inches, by formula (1):

$$D = \frac{8.65 \sqrt{\frac{12 - 8.65}{\frac{2}{3}(8.65)}}}{2}$$

$$= 3.3 \text{ inches}$$

If the conveyor width is twelve inches (12"):

$$\theta = \tan^{-1}\left(\frac{3.3}{12}\right)$$

$$= \tan^{-1} .27$$
$$= 15.36 \text{ degrees}$$

This same result could be obtained directly by equation (6), and, in fact, a basic understanding of the relationships herein defined lend themselves quite readily to resolution by a computer programmed to determine $\theta$ if one inputs the inside radius of the turn, the longitudinal spacing of the flights and the width of conveyor ribbon for which the flights are to provide support.

As may now be apparent, the flights may be permanently secured to the conveyor 11, as best depicted in FIG. 5. That is, the support member 51 may be fixedly secured to a belt member 20 at the apex 52 of the angle $\theta$, as by weldment 53. To preclude inadvertent interference with the pickets 13 the weldment 53 is preferably located just inwardly of the pickets 13a forming the outer edge of the conveyor 11, and the cylindrical, metallic stock from which the flight 50 is formed may extend vertically upwardly from the weldment 53 to present a retaining post 54 which serves to prevent the ribbon of whatever material 12 is being transported on the conveyor 11 from inadvertantly moving radially outwardly off the conveyor.

At the radially innermost end of the support member 15 the cylindrical, metallic stock may be turned downwardly to form a rigid riser 55 that may be fixedly secured to the web member 20, also as by a weldment 56. The weldment 56 is disposed radially outwardly of the picket 13b forming the inner edge of the conveyor 11, thereby obviating interference with the telescopic compression of the successive pickets 13.

Figure 7:
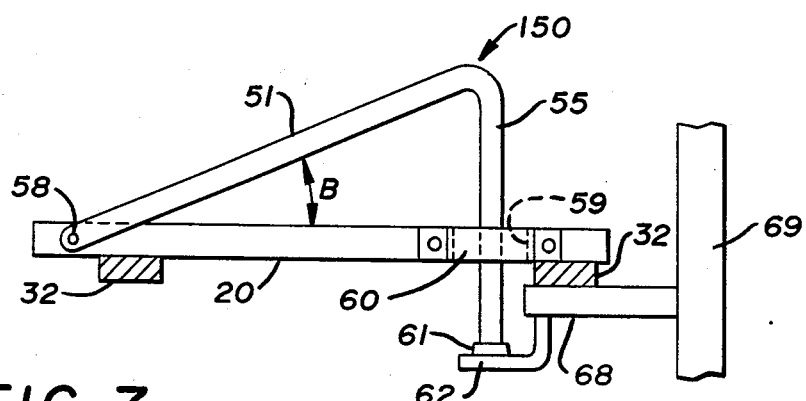
FIG. 7 is a view similar to FIG. 5 but depicting an alternative form of the invention; and, FIG. 8 is a schematic top plan of a conveyor embodying the concept of the present invention to depict the varying relationship of the components in a straightaway as compared to a turn.
Figure 8:
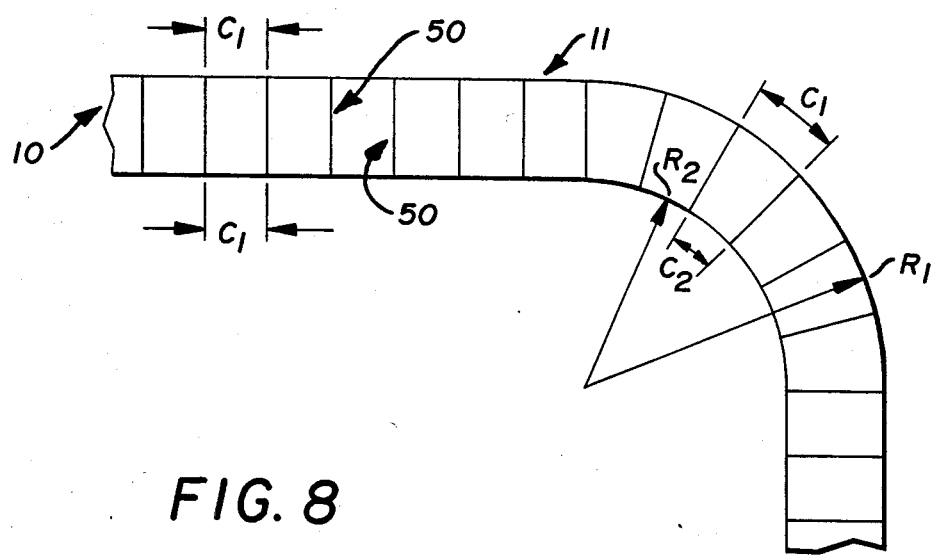

The aforesaid arrangement is perfectly acceptable for use in conjunction with a constant turning radius. However, it should be appreciated that the concept heretofore disclosed may also be employed with particular facility in situations where the conveyor is caused to turn about radii of varying length and/or in situations where the ribbon must lie absolutely flat on the straightaway and be inclined to the required angularity for any turn. Such a result can be accomplished, as depicted schematically in FIG. 7, by connecting the supporting member 51 of flight 150 to the belt member 20 at the radially outer edge by virtue of a pivotal, connector pin 58. The riser 55, rather than being connected to the belt member 20 passes closely therepast, and preferably between the belt member 20 and the U-shaped aperture 59 of an eye strap 60 secured to the side of the belt member 20. The lower extremity of the riser 55 terminates in the follower 61 that slidably engages a track cam 62 configured to position the support member 51 at the angularity $\theta$ required for the turning radius of the conveyor at any given point along its traverse. The track cam 62 may, for example, be supported from beam members 68 cantilevered inwardly from the columns 69 which comprise the vertical members of the framework 31 (FIG. 1) within which the cages 30 are rotatably received.

As such, it should now be apparent that the present invention permits a ribbon to be supported on a conveyor belt without deleteriously deforming the ribbon, even as the conveyor negotiates a turn, and otherwise accomplishes the objects of the invention.

I claim:

1. A conveyor system having a plurality of transverse belt members with inner and outer ends, picket means secured to the inner and outer ends of said belt members, said picket means being nestable and telescopic with the picket means on successive belt members and inter-engaging successive belt members to permit said belt members to move effectively along a straightaway as well as through right- or left-hand turns, support members to permit a flat ribbon of material to negotiate turns without deleteriously deforming the ribbon being presented from said belt members at selected longitudinal intervals along said conveyor system, said support members being inclined upwardly relative to the belt members each support member being inclined upwardly from an outer edge of the turn towards an inner edge of the turn.

2. A conveyor system, as set forth in claim 1, each support member forms an apex with an outer edge of said conveyor and is inclined toward the inner edge at an angle $\theta$, each support member is further secured at the inner edge of a belt member.

3. A conveyor system, as set forth in claim 2, in which the angle $\theta$ is determined as a mathematical function of the radius of said turn, the width of said conveyor and the longitudinal spacing of said support members as the conveyor moves along a straightaway.

4. A conveyor, as set forth in claim 3, in which the angle $\theta$ may be determined by the following equation:

$$\theta = \tan^{-1} \frac{\frac{C_1 R_1}{R_1 + W} \sqrt{\frac{C_1 - \frac{C_1 R_1}{R_1 + W}}{\frac{2}{3}\left(\frac{C_1 R_1}{R_1 + W}\right)}}}{2W}$$

wherein $C_1$ equals the longitudinal spacing between successive support members when said conveyor is moving along a straightaway; $R_1$ equals the radius of the turn through which the conveyor is moving, measured to the inner edge of the conveyor; and, W equals the width of the conveyor.

5. The conveyor system, as set forth in claim 2, wherein the support member is rigidly affixed to the belt members.

6. A conveyor system, as set forth in claim 2, wherein each support member is slidably secured to a belt member in proximity to the inner edge of the conveyor and is further preferably secured to a belt member in proximity to the outer edge by a pivotal connector which forms an apex, a follower is presented from the support member radially inwardly of the pivotal connection in proximity of said inner edge which slidably engages a cam means to position said support member relative to said pivotal connection at a selected angle $\theta$.

7. A conveyor system, as set forth in claim 6, in which the angle $\theta$ is determined as a mathematical function of the radius of said turn, the width of said conveyor and the longitudinal spacing of said support members as the conveyor moves along the straightaway.

8. A conveyor system, as set forth in claim 7, in which the angle $\theta$ may be determined by the following equation wherein $C_1$ equals the longitudinal spacing between successive support members when said conveyor is moving along a straightaway; $R_1$ equals the radius of the turn through which the conveyor is moving, measured to the inner edge of the conveyor, and W equals the width of the conveyor:

$$\theta = \tan^{-1} \frac{\frac{C_1 R_1}{R_1 + W} \sqrt{\frac{C_1 - \frac{C_1 R_1}{R_1 + W}}{\frac{2}{3}\left(\frac{C_1 R_1}{R_1 + W}\right)}}}{2W}. \tag{6}$$

* * * * *